G. W. BABCOCK.
COMB HONEY PRODUCING FRAME.
APPLICATION FILED DEC. 24, 1914.
1,188,386.
Patented June 27, 1916.
3 SHEETS—SHEET 1.
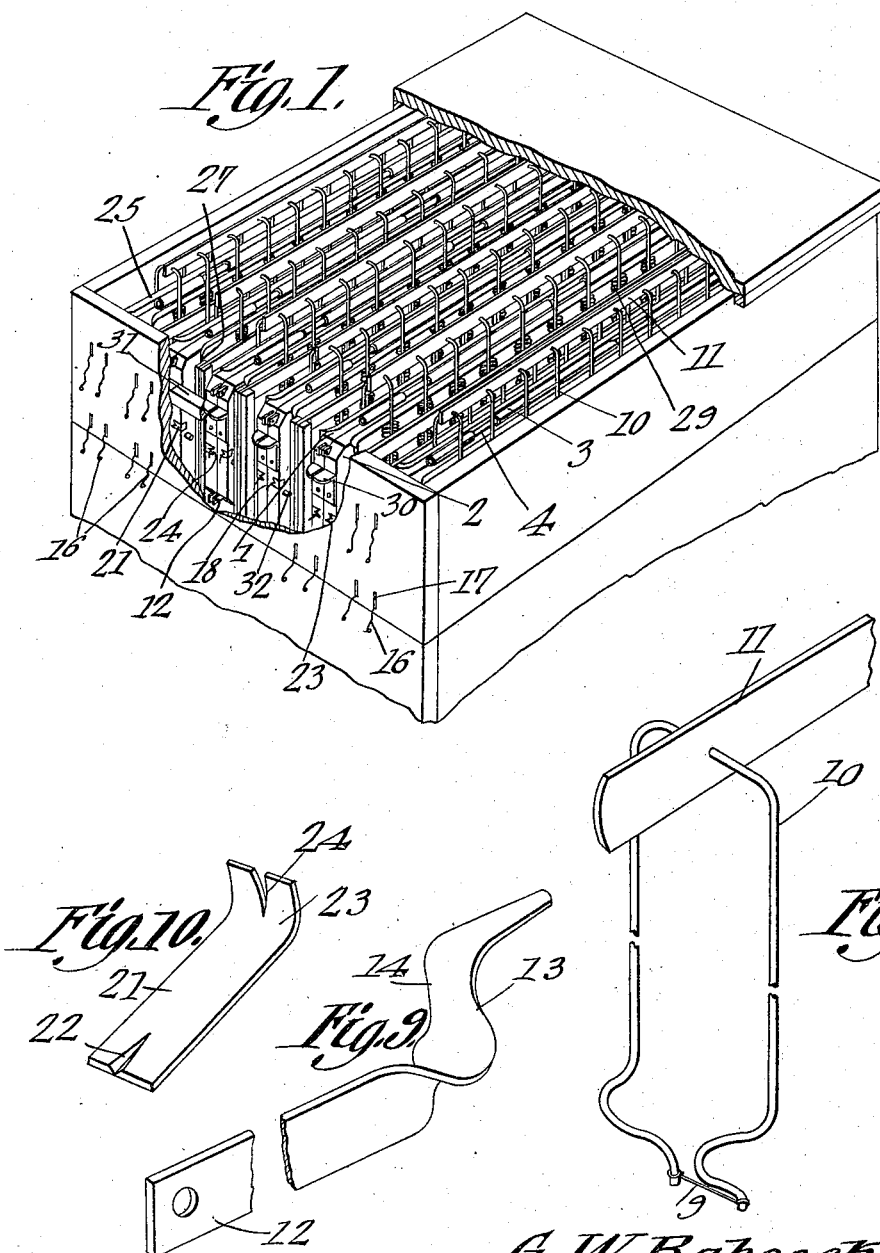
Witnesses
G. W. Babcock, Inventor
by C. A. Snow & Co., Attorneys

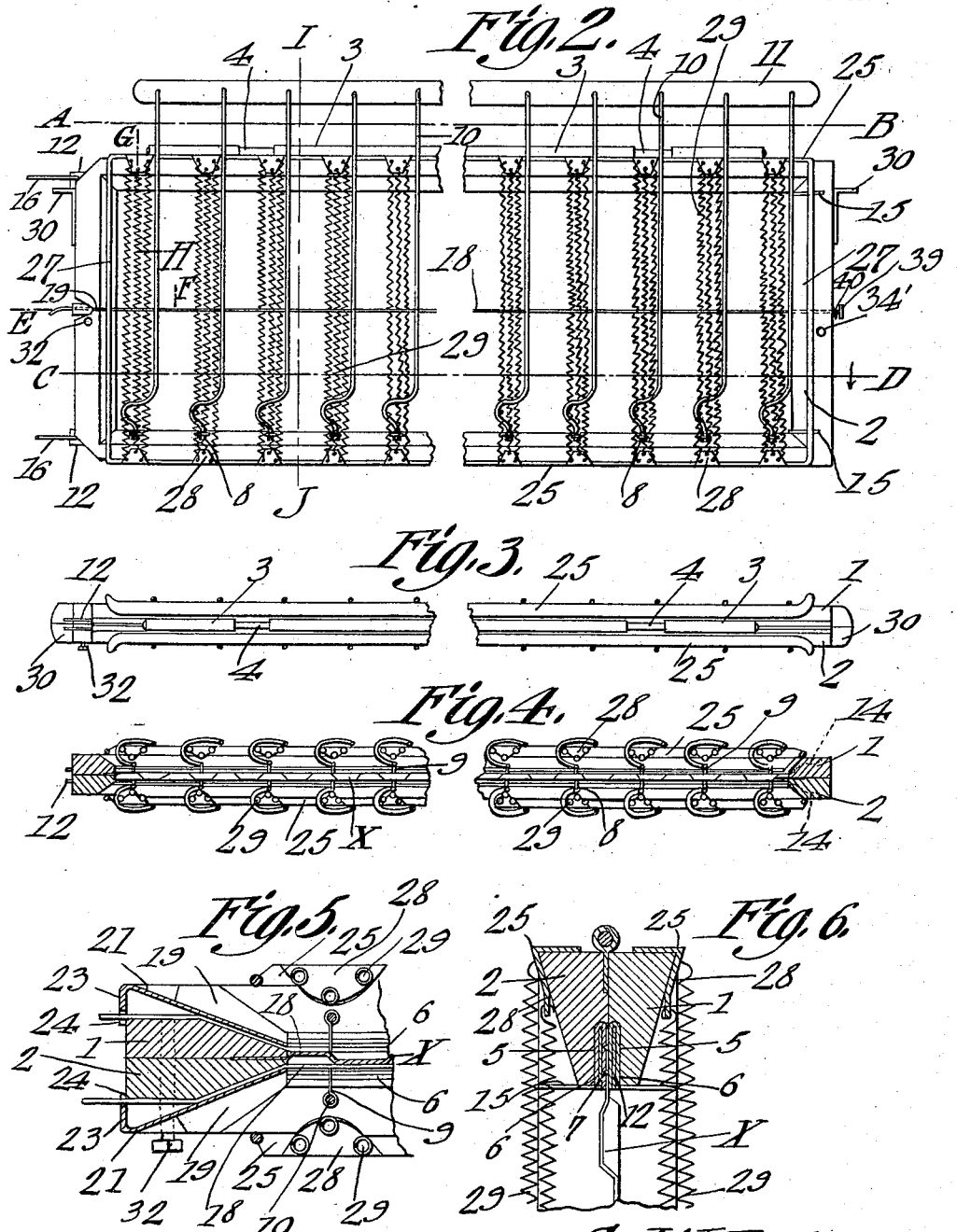

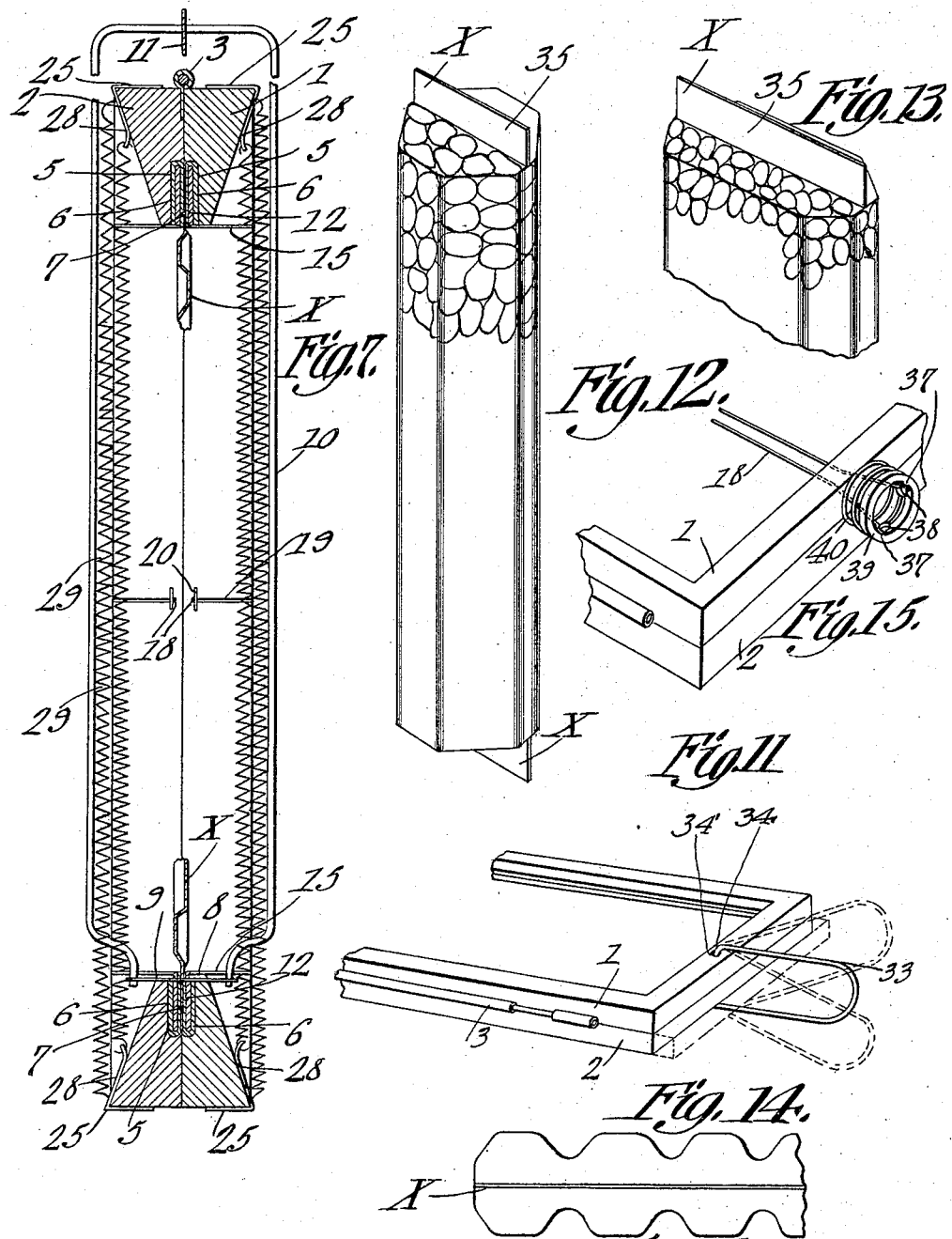

van # UNITED STATES PATENT OFFICE.

GEORGE W. BABCOCK, OF BROCKPORT, NEW YORK.

COMB-HONEY-PRODUCING FRAME.

1,188,386.
Specification of Letters Patent. Patented June 27, 1916.

Application filed December 24, 1914. Serial No. 878,910.

*To all whom it may concern:*

Be it known that I, GEORGE W. BABCOCK, a citizen of the United States, residing at Brockport, in the county of Monroe and State of New York, have invented a new and useful Comb-Honey-Producing Frame, of which the following is a specification.

This invention relates to bee culture and more particularly to a comb honey producing frame, one of the objects of the invention being to provide means whereby cakes or sticks of comb honey may be formed in any desired shapes and sizes, the said cakes being completed in the hive and being finished with rounded faces which are sealed or capped over by the bees whereby there is an absence of moisture on the exterior faces of the completed articles.

A further object is to provide a novel form of frame to be placed in the hive or super and which frame is equipped with novel means for holding the comb foundation.

A further object is to provide novel means for controlling the action of the bees whereby the sections or cakes of comb honey produced in the frame are provided with rounded faces.

Another object is to provide means whereby the various cakes of comb honey can be separated without removing the frame from the hive or super, the severed portions being thus left properly supported in the frame where the bees will be free to collect the released honey, thus completing the formation of the separate cakes.

Another object is to provide simple means whereby the cakes or sticks of comb honey formed in the frame can be severed transversely, thus to divide the same into two parts, this action taking place without removing the frame from the hive or super so that the honey freed from the cut cells can be taken up by the bees and the cut cells sealed or capped so that a finished product will be obtained.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the accompanying drawings the preferred form of the invention has been shown.

In said drawings:—Figure 1 is a perspective view of a portion of a hive with the super thereon, parts of the super being broken away to show the set of frames and fences within the super. Fig. 2 is a side elevation of a frame, the middle portion thereof being removed. Fig. 3 is a section on line A—B Fig. 2. Fig. 4 is a section on line C—D Fig. 2. Fig. 5 is an enlarged section on line E—F Fig. 2. Fig. 6 is an enlarged section on line G—H Fig. 2. Fig. 7 is an enlarged section on line I—J Fig. 2, only a portion of the comb foundation being shown. Fig. 8 is a perspective view of one of the vertical cutters and its actuating bar. Fig. 9 is a perspective view of one of the top and bottom cutters. Fig. 10 is a detail view of one of the fastening clips of the intermediate cutter or wire. Fig. 11 is a perspective view showing the application of the implement used in the final cutting of the product. Fig. 12 is a perspective view of a stick of comb honey such as may be produced by means of the apparatus forming the present invention. Fig. 13 is a perspective view of one end portion of another form of cake or stick which can be produced. Fig. 14 is a top plan view of a portion of a comb as it appears prior to being cut into sections. Fig. 15 is a detail view showing the manner of connecting the severing and reinforcing wires at one end.

Referring to the figures by characters of reference 1 and 2 designate the opposed sections of a frame, these sections being hingedly connected at their tops, as shown at 3 and the parts of the hinge being spaced, as at 4, so as to allow each frame section to shift laterally a limited distance relative to the other section. The inner or meeting faces of the upper and lower rails of the frame sections are grooved or rabbeted, as at 5, thus to receive channeled guide strips 6 designed to bind upon the upper and lower edges of a comb foundation X, the side edges of the foundation being gripped between the side rails of the frame section 1. Short teeth or spurs 7 are provided preferably on the channel strips 6 of one frame section and are adapted to project through the foundation. Apertures are formed within the opposed channel strips 6 and are adapted to hold the foundation to said strips.

Transverse grooves 8 are provided in the upper edges of the bottom rails of frame sections 1 and 2 and constitute seats for the reception of a cutting wire 9 attached at its ends to the terminals of a yoke 10. This yoke is preferably formed of stiff wire and is so proportioned that the legs of the yoke will lie outside of the frame while the intermediate portion of the yoke will extend over the frame. Any desired number of these yokes with their cutting wires may be provided and all of the yokes are attached to a single connecting bar 11 which, when elevated, will cause all of the yokes to be raised and all of the wires 9 to cut upwardly through the comb honey and through the foundation, thus severing the contents of the frame into separate cakes or sticks extending throughout the height of the interior of the frame.

Mounted within each of the channel strips 6 is a slide 12 provided at one end with a shearing blade 13, the inner or cutting edge 14 of which is preferably obliquely disposed, as shown, these blades being seated normally within grooves 15 formed in the upper and lower end portions of the side rails of the frame sections. Each blade 13 extends outwardly from one side of the comb foundation so that, when the blade is drawn from one end to the other of the frame, it will sever the comb honey from the adjacent top or bottom rail of the frame without, however, severing the comb foundation. For the purpose of actuating the blades 13, wires 16 or the like are connected to the slides 12 and extend through openings 17 in the walls of the hive or super. Thus by pulling these actuating wires or cords, the slides can be drawn longitudinally within the channel strips 6 and the blades will thus sever the comb honey from the upper and lower rails of the frame section without severing the comb foundation.

In order that the cakes or sticks of comb honey in the frame sections may be severed transversely at intermediate points, a severing wire 18 is secured at one end to one side of each frame section close to the center thereof, this wire being extended close to and longitudinally of the comb foundation. One end of the wire is extended through a slot 19 formed in that side of the frame section remote from the secured end of the wire and opposed grooves 20 are formed in the upper and lower walls of each slot 19 for the reception of a key or clip 21 such as shown in detail in Fig. 10. This key is preferably formed of a small metal plate having a groove or notch 22 in one end while the other end is offset as at 23, this offset portion being provided with a V-shaped slot 24. Thus after the free end of the cutting wire 18 has been swung laterally into the slot 19 and between the grooves 20, a key such as shown in Fig. 10 is inserted into the grooves 20, the notch 22 receiving a portion of the wire while the offset portion 23 laps the outer side of the frame section, the wire 18 being engaged by the walls of the V-shaped slot 24. Thus wire 18 is held securely in place.

As shown particularly in Figs. 5, 6 and 7, the frame sections 1 and 2 are flared. In other words, the front and back faces of each frame converge inwardly. The top and bottom rails of the frame sections are engaged by detachable angle strips 25, the ends of which are connected by integral rods or frame members 27. Ears 28 may be provided along the angle strips 25, these ears being engaged by the ends of coiled springs 29 preferably disposed in groups. Any desired number of coils 29 can be arranged in one group and these groups can be located any desired distances apart.

Attention is called to the fact that the lower ends of the yokes 10 are curved laterally and inwardly so as thus to partly wrap about the groups of coils and bring the cutting wires 9 directly between opposed groups carried by the frame.

In order that the frames may be properly held within the hive or super, each frame section is provided at its ends with outstanding ears 30 and these ears are adapted to rest upon supporting cleats 31. Any suitable means such as a screw 32 or any desired form of holding pin is provided for holding the sections of each frame together while the foundation is mounted between the sections.

In using the frames herein described, the same are swung apart after which a comb foundation is placed upon the inner face of one of the sections and said sections then swung together so that the teeth or prongs 7 on one frame section will engage the foundation and the foundation will also be held by the apertures in the other frame section. The sections are then fastened together by means of the screw or pin 32, the wires 18 being thus supported against the respective sides of the foundations. The knives 14 are normally seated within the grooves 15. A frame made up of the angle strips 25 and their connections 27 is placed on each side of the comb honey frame and these applied frames have coiled wires 29 grouped together at desired distances apart. The yokes 10 are assembled at distances apart equal to the distances between the groups of coils 29 and the cutting wires 9 are threaded through the grooves 8 and attached at their ends to the terminals of the yokes. With the frame thus arranged, it is placed within the hive or super, the ears 30 resting on the supporting cleats 31 and the wires 16 being extended through openings in the wall of the hive or super as shown.

As the groups of coils extend into the comb honey frames toward the foundations X, the bees in building the combs will work away from the groups of coils with the result that the honey comb produced will be formed with parallel bulged portions as shown in Fig. 14. After the comb has been built out to the desired proportions, the top of the hive or super is removed and the wires 18 in each frame are either withdrawn longitudinally from the frame sections or else swung laterally so as to sever the combs transversely from the foundation outwardly. When it is desired to remove the wires longitudinally, the keys 21 are partly withdrawn from the grooves 20 and those ends of the wires remote from the keys are grasped and pulled longitudinally so that the wires will thus be withdrawn from the combs without injuring them. Thus the comb structure will remain unbroken throughout the height thereof. However, by grasping the released end of each wire 18 and swinging the wire laterally through the groove 19 and outwardly beyond the frame, the comb can be cut transversely from the foundation outwardly, so that while the foundation will remain unbroken throughout its height, the comb structure will be severed.

After the removal of the wires 18, either subsequent to their withdrawal longitudinally from the frame or their lateral movement for the purpose of severing the combs, the bars 11 are pulled upwardly. Thus the yokes 10 connected to each bar will draw the cutting wires 9 upwardly out of the grooves 8 and cause said wires to sever the combs and the foundation X along the centers of the depressions provided between the bulged portions of the comb.

Subsequent to the cutting of the comb the honey contained within the severed cells will be released and will be collected by the bees and deposited in other cells with the result that separate cakes or blocks of honey will thus be left in a clean finished condition within the hive or super. After the separation of the comb into separate cakes or sticks, the cords 16 can be actuated so as to draw knives 14 along the inner edges of the top and bottom rails of the frame sections, these knives thus acting to cut the comb away from the frame sections. Any honey released in this operation will likewise be collected by the bees. Obviously after the cutting of the combs in the manner pointed out, separate independent sticks or cakes of honey will be left within the frame, these cakes or sticks being held in position by the projecting upper and lower ends of the foundation. Each section of honey thus produced can have the appearance of a stick, as shown in Fig. 12 or of a cake as shown in Fig. 13, the cells of each section or stick being all capped or sealed and the outer surface being dry so that the stick or cake can be handled without soiling the fingers.

After the sections have been completed in the manner described, the frames can be removed from the hive or super and a yoke 33 having inwardly extending fingers 34 as shown in Fig. 11, can be placed astride the frame and the fingers 34 pressed toward each other into holes 34' provided therefor. By then rocking the yoke it will act as a lever and cause the frame sections to rub by reason of their slidable connections at their hinges so that the teeth 7 will cut through the projecting or holding portions of the foundation and cut off said foundation flush or substantially flush with the ends of the combs forming the sticks or cakes. The finished articles will be free of the projecting lips 35 shown in Figs. 12 and 13. The articles thus produced can be marketed as complete articles and can be handled without soiling the fingers. Obviously by adjusting the coils 29 relative to each other, the sizes of the articles produced can be varied as to width and, by means of the transverse wires 18, the lengths of the articles can be reduced by one half. Furthermore it is to be understood that the number of the cutting wires 18 can be increased and obviously the various parts of the apparatus can be so varied that completed articles of any desired shapes and proportions can be formed.

Importance is attached to the fact that the outer faces of the frame are flared as the bees will thus build out the cells more thoroughly along the top, bottom and sides of the frames than would be the case should said frames be extended straight out from the comb foundation as heretofore.

While the wires 18 constitute comb cutting means, they are also important in that they reinforce the comb foundation along the center thereof and consequently prevent the comb foundation from bulging outwardly.

As the yokes 10 are made preferably of spring metal, they constantly hold the cutting wires 9 taut so that they operate efficiently to cut the comb and foundation.

It is to be understood that fences are to be provided as ordinarily between the frames in the hive or super, these fences being indicated generally at 36.

It is to be understood that the wires 18 can be secured to the frame sections 1 and 2 in any desired manner at those ends thereof remote from the keys 21. It is preferred, however, to attach them in the manner shown in Fig. 15. By referring to this figure it will be seen that each of the wires 18 is provided with a loop 37 and that the two loops detachably engage diametrically opposed lugs 38 extending upwardly from a ring-like cap 39 which is seated upon the outer end of a coiled spring 40 mounted on the side of the frame. Thus it will be seen that the spring 40 is constantly under compression and serves to push against the cap 39 and thus draw the wires 18 taut. The loops 37, however, can be easily detached whenever desired by slipping them off of the lugs 38.

What is claimed is:—

1. The herein described method of producing separate sections of comb honey within a single frame, which consists in forcing bees to build the comb with depressions therein, then severing the comb along the depressions to form separate sections and to permit honey to drain from the severed cells, and to leave the comb within the hive to permit the bees to take up the freed honey and seal the severed cell walls.

2. The herein described method of forming separate sections of comb honey within a single frame, which consists in positioning a central comb foundation within the frame, causing bees to erect cells upon opposite faces of the foundation and to form opposed depressions within the comb, then severing the comb and foundation along the depressions, and finally severing the comb from the frame without severing the foundation, the comb remaining within the hive subsequent to the severing thereof, whereby the bees are permitted to collect the freed honey.

3. As an article of manufacture, a stick of comb honey comprising a comb foundation extending from one side extremity to the other of the stick and a cellular structure built out from each side of the foundation, the cells of said structure being sealed to present a dry exterior surface extending continuously around the stick.

In testimony that I claim the foregoing as my own, I have hereto affixed my signature in the presence of two witnesses.

GEO. W. BABCOCK.

Witnesses:
HAROLD R. ADAMS,
EDWARD R. OSBORNE.

Copies of this patent may be obtained for five cents each, by addressing the "Commissioner of Patents, Washington, D. C."